Fig. 8.

UNITED STATES PATENT OFFICE.

OLAF O. MARTIN, OF PORTLAND, OREGON, ASSIGNOR TO ELLIOTT-FISHER COMPANY, OF NEW YORK, N. Y., A CORPORATION OF DELAWARE.

TYPE-WRITING MACHINE.

1,136,028.  Specification of Letters Patent.  Patented Apr. 20, 1915.

Application filed April 1, 1911.  Serial No. 618,264.

*To all whom it may concern:*

Be it known that I, OLAF O. MARTIN, a citizen of the United States, residing at Portland, in the State of Oregon, have invented certain new and useful Improvements in Type-Writing Machines, of which the following is a specification.

This invention relates to typewriting machines and more particularly to carriage retracting and line spacing mechanism therefor.

One object of the invention is to provide a motor under the control of the operator and adapted to retract the carriage at any time and from any position to its initial position at the beginning of the line.

Another object of the invention is to effect a coöperative relation between the line spacing mechanism and the carriage retracting motor and to provide a plurality of controlling devices which may be manipulated either to effect both line spacing and carriage retraction or carriage retraction alone.

Another object is to provide means whereby line spacing will be effected automatically upon the retraction of the carriage.

Other objects subordinate to those enumerated will appear as the succeeding description of the illustrated structure is developed.

In the accompanying drawings.

Each part is designated by its appropriate reference character wherever shown.

Upon a suitable support or stand 1, which, in the present instance, is constructed of metal tubing, is mounted what is known in the art as a platen frame 2 in which is mounted the paper supporting and feeding mechanism and upon which is carried the main machine frame 3 which supports a movable carriage 4 propelled in the direction of letter spacing by spring drums 5 connected to the carriage by tapes 6. The carriage 4 supports, as usual, the downwardly acting printing mechanism (not shown), the operation of which, as usual, causes an intermittent escapement of the mechanism and the step by step advance of the carriage in the direction of letter spacing. Supported by the main frame 3, in rear thereof, is a register bar 7 upon which is mounted one or more computing devices or registers 8 operated by actuating mechanism mounted on the carriage 4 and under the control of the numeral keys of the printing mechanism.

The machine selected for illustrative purposes is so well known in the art that a merely conventional illustration is thought sufficient but for a more complete disclosure, reference is made to Patents 873868, 825469 and 829971.

Figure 6:
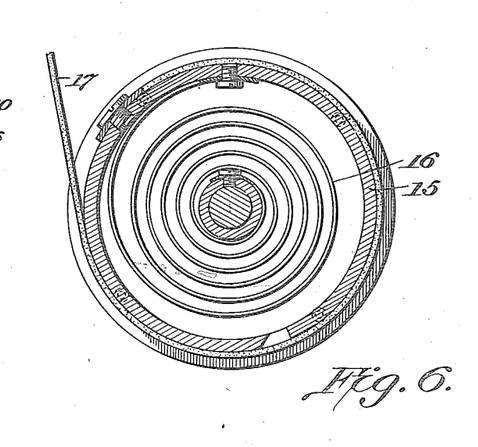
Fig. 6 is a sectional view of the carriage retracting drum and tape.
Figure 7:
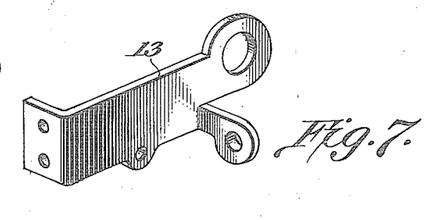
Fig. 7 is a detail perspective view of the front bearing bracket for the motor shaft.

Ordinarily the carriage 4 is retracted by hand to reposition the carriage for the writing of a new line and to restore the carrying mechanism of the adding devices 8. My invention, however, contemplates the employment of a motor to retract the carriage and incidentally to rewind the carriage propelling drums 5 and reset the adding devices. To this end a motor 9, preferably of a standard electrical type, is mounted on the stand 1 and is geared to a motor shaft 10 afforded bearings in the gear case 11 of the motor and also in special bearing brackets 12 and 13, the former depending from the frame 3, see Figs. 2 and 3, and the latter extending laterally from the front end of the platen frame 2. The bracket 12 is provided with a stationary cylindrical bushing 14 in which the shaft 10 rotates and upon which is arranged to rotate loosely a retracting drum 15. The drum 15 is generally similar to the carriage propelling drum 5, but contains a somewhat weaker spring 16, secured at one end to the stationary bushing 14 and at its opposite end to the outer wall of the drum 15. (See Figs. 2 and 6). About the periphery of the drum 15 is wound a carriage retracting tape 17 having its opposite end secured to the carriage 4 and guided by an intermediate guide roller 18 suitably mounted on the frame 3. (See Fig. 3).

Figures 1, 2, 3, 4:
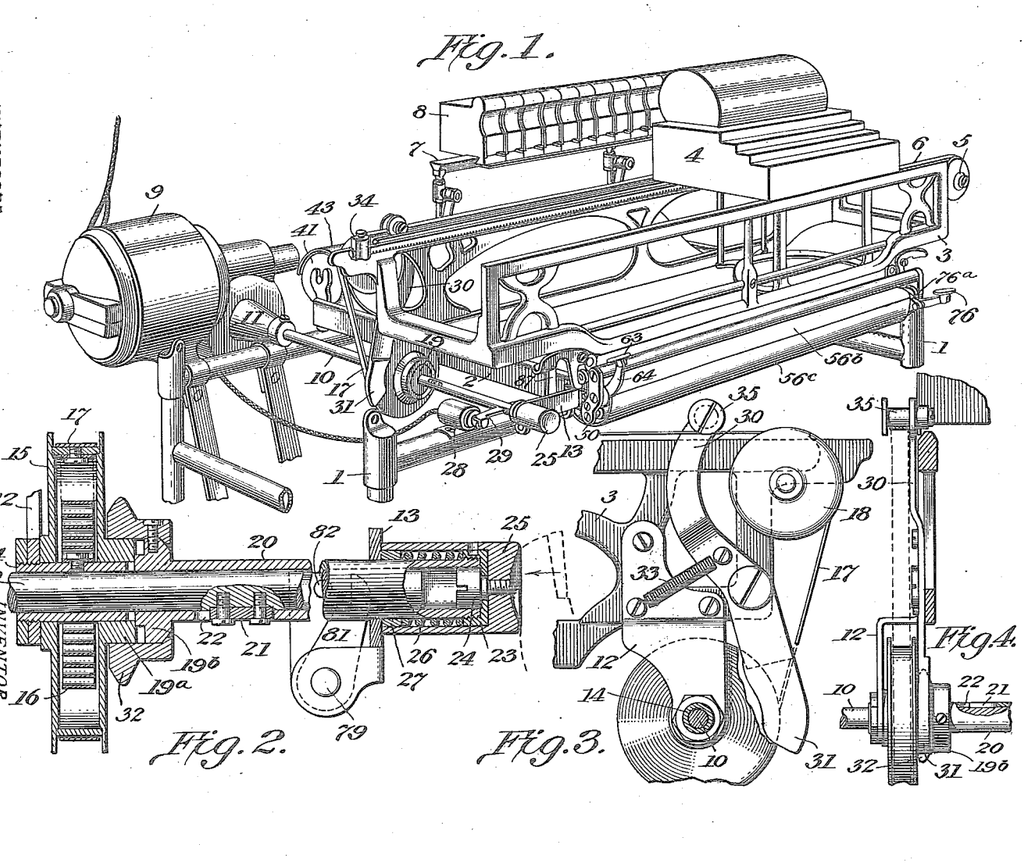
—Figure 1 is a conventional perspective view of an Elliott-Fisher writing adding machine equipped with line spacing and carriage retracting mechanism in accordance with my invention.
Fig. 2 is a sectional view through the motor clutch and associated parts.
Fig. 3 is a rear elevation of a portion of the machine frame showing the mounting and relation of the motor clutch, clutch lever and the carriage retracting tape.
Fig. 4 is an edge view of the parts shown in Fig. 3 with the machine frame and retracting tape in section.
Figure 5:
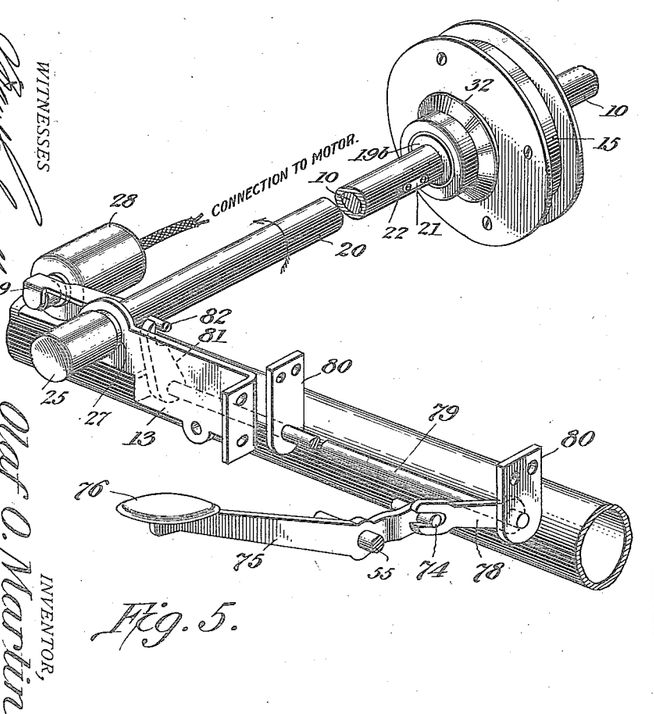
Fig. 5 is a perspective view of the motor clutch, motor switch, the two motor controlling keys and the intermediate connection.

The direction of winding of the spring 16 is such that the normal tendency of the drum 15 is to rotate in the proper direction to maintain the retracting tape 17 in taut condition, but the strength of the spring 16 is insufficient to materially oppose the carriage propelling mechanism. As the drum 15 rotates freely on the bushing 14, it will be seen that as the carriage advances the pull on the tape 17 will cause the same to unwind from the drum 15 and the rotation of said drum will wind the spring 16. If now the carriage 4 is retracted, as for instance, by hand the slack which would otherwise be produced in the tape 17 is taken up by the reverse rotation of the drum 15 under the impulse of its spring. Normally the retracting drum 15 is free to rotate in one direction or the other as the carriage is moved forward or back, but when it is desired to utilize the motor for the retraction of the carriage, a connection is established between the motor shaft 10 and the retracting drum 15 by a motor clutch 19 comprising two correspondingly toothed clutch members 19$^a$ and 19$^b$, the former being preferably formed integral with one side wall of the drum 15 and the other being formed at the end of a clutch sleeve 20, surrounding the motor shaft 10 and extended through the bracket 13 and somewhat beyond the front end of the shaft, as shown in Fig. 2.

The clutch sleeve 20 is designed to rotate with the shaft 10, but has limited independent longitudinal movement to engage and disengage the clutch members. This relation of the shaft 10 and the sleeve 20 is secured by providing the shaft with a block or spline 21 received within a slot 22 in the sleeve. Screwed upon the outer end of the sleeve 20 is a cap 23 to which is secured, as by a screw 24, a key 25 of cylindrical form which acts as a housing for a clutch retracting spring 26 surrounding the sleeve 20 and interposed between the cap 23 and the bracket 13 or a ring 27 secured to the bracket and constituting a bearing for the rear end of the cylindrical key. Normally the sleeve 20 and the clutch member 19$^b$ are held in their forward or retract position by the spring 26.

When it is desired to retract the carriage, it is simply necessary for the operator to push the key 25 rearwardly against the resistance of the spring 26, thus moving the clutch member 19$^b$ into engagement with the clutch member 19$^a$ and thereby effecting a driving connection between the motor shaft 10 and the carriage retracting drum 15. In order to start the motor 19 simultaneously with the throwing in of the motor clutch, a starting switch 28 is mounted at the front of the stand 1 and in a position to be operated by an arm 29 projecting laterally from the sleeve 20, the rearward movement of the sleeve thus serving to throw in the clutch 14 and close the starting switch. In the particular type of machine herein illustrated, the frame 3 is normally stationary and the typewritten matter is line spaced by the movement of the paper. The frame, however, is capable of being moved back away from the front of the platen frame 2 to facilitate access to the paper sheet and its supporting and feeding mechanism. The carriage retracting mechanism, which has been described, accommodates this shifting of the frame 2, since it will be seen that when the frame is thus shifted, the bracket 12 moves rearwardly with it, the bushing 14 sliding longitudinally of the shaft 10 and carrying with it the retracting drum 15 and the clutch member 19$^a$ associated with said drum. When the frame 3 is moved forward again to normal position, the drum 15 and the clutch member 19$^a$ are likewise restored to normal position to be engaged, when desired, by the other clutch member, it being, of course, understood that there is no occasion for retracting the carriage except when the machine is in its normal or printing position. In order to insure the positive disengagement of the clutch when the carriage reaches its fully retracted position, I provide a clutch lever 30 fulcrumed on the frame 3, as shown in Fig. 4, and having a wedge shaped portion 31 designed to be forced between the side wall of the retracting drum 15 and an annular extension of the clutch member 19$^b$. The lever 30 is held in normal position by a spring 33 and its upper end is disposed in the path of the carriage 4. When the carriage approaches the limit of its retractile movement, it engages the upper end of the lever 30 and swinging the lever against the resistance of the spring 33 causes its wedge shaped lower end 31 to be forced between the retracting drum and the clutch extension 32 thereby positively forcing the clutch member 19$^b$ out of engagement with the clutch member 19$^a$ and positively breaking the connection between the motor and the carriage to prevent undue strain on the carriage retracting tape by reason of continued frictional engagement of the clutch members after the carriage had been arrested by engagement with the carriage stop 34. If desired, the upper end of the clutch lever 30 may be equipped with a small flanged guide roller 35 for the tape 17.

As heretofore stated, the motor controlling mechanism and the line spacing mechanism are interrelated, and having now described the connection between the motor and the carriage and the mechanism whereby this connection is controlled, I shall now describe the mechanism for supporting and feeding the paper and then the instrumentalities whereby the line space lever and the carriage retracting devices are rendered more or less interdependent.

Figure 8:
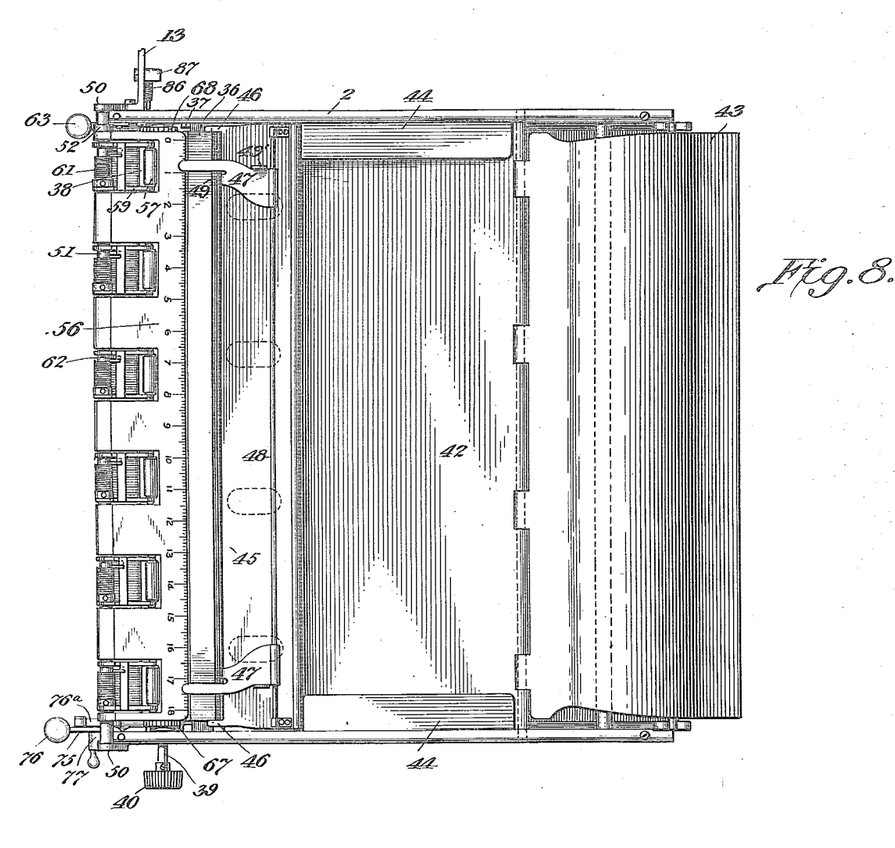
Fig. 8 is a plan view of the platen frame and the parts carried thereby.
Figure 9:
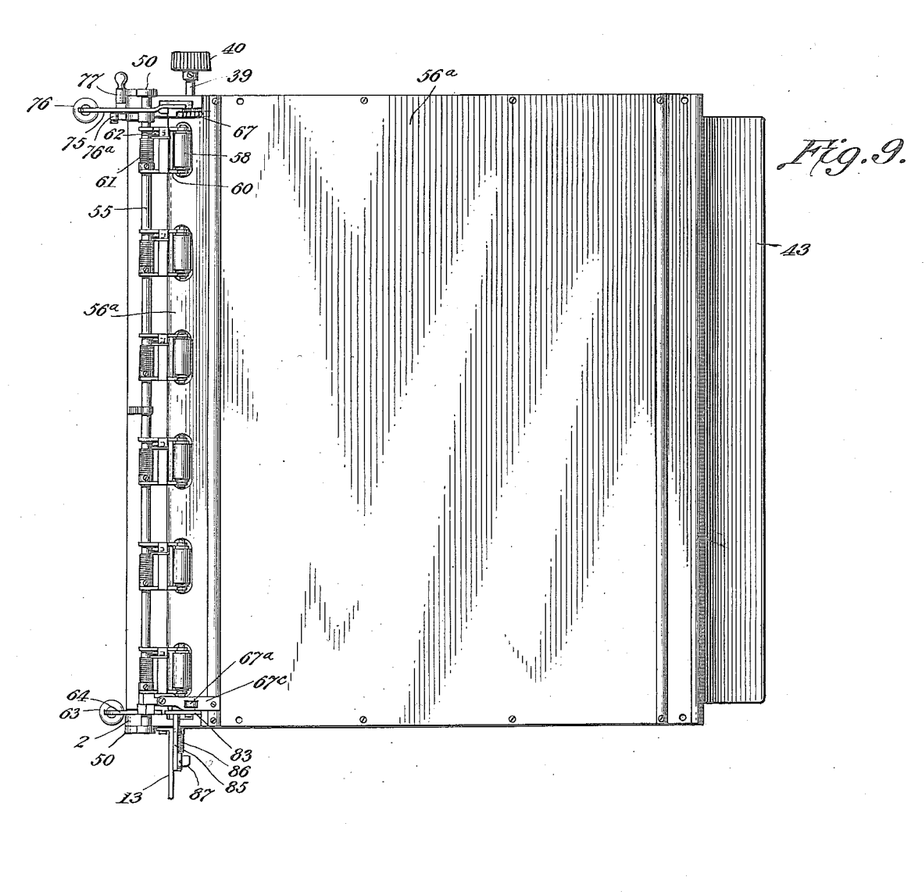
Fig. 9 is a bottom plan view of the same.
Figures 10, 11:
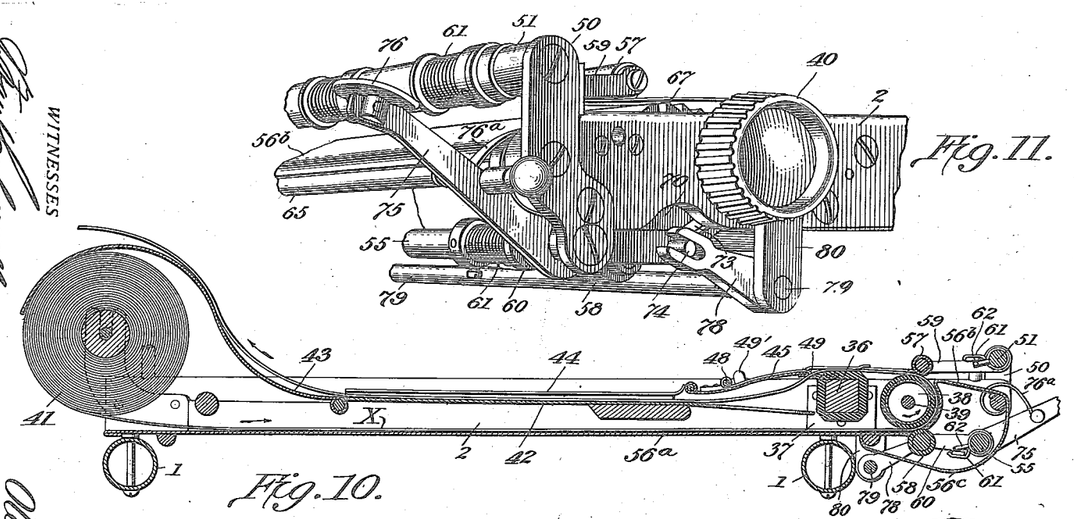
Fig. 10 is a longitudinal section through the platen frame, platen, paper roll and paper holding and feeding mechanism.
Fig. 11 is a perspective view of the right hand, front corner of the platen frame, showing certain elements of the paper holding and feeding mechanism and a portion of the connection between the line space lever and the motor controlling mechanism.
Figure 12:
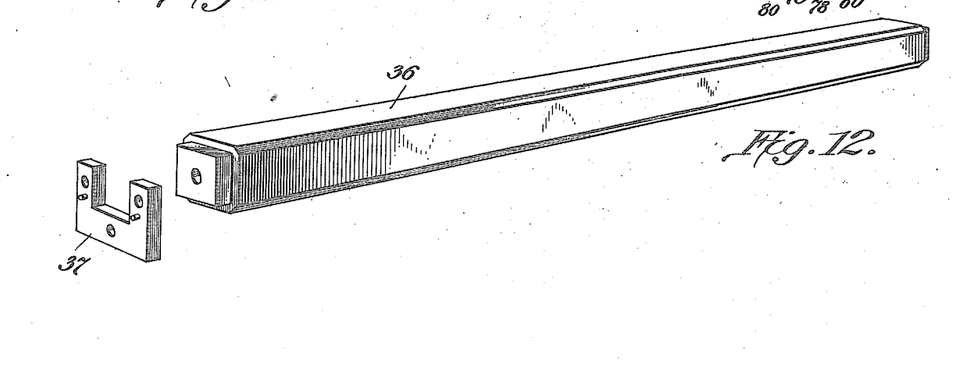
Fig. 12 is a detail perspective view of the platen and one of its rests or sockets.
Figures 18, 19, 20, 21, 22:
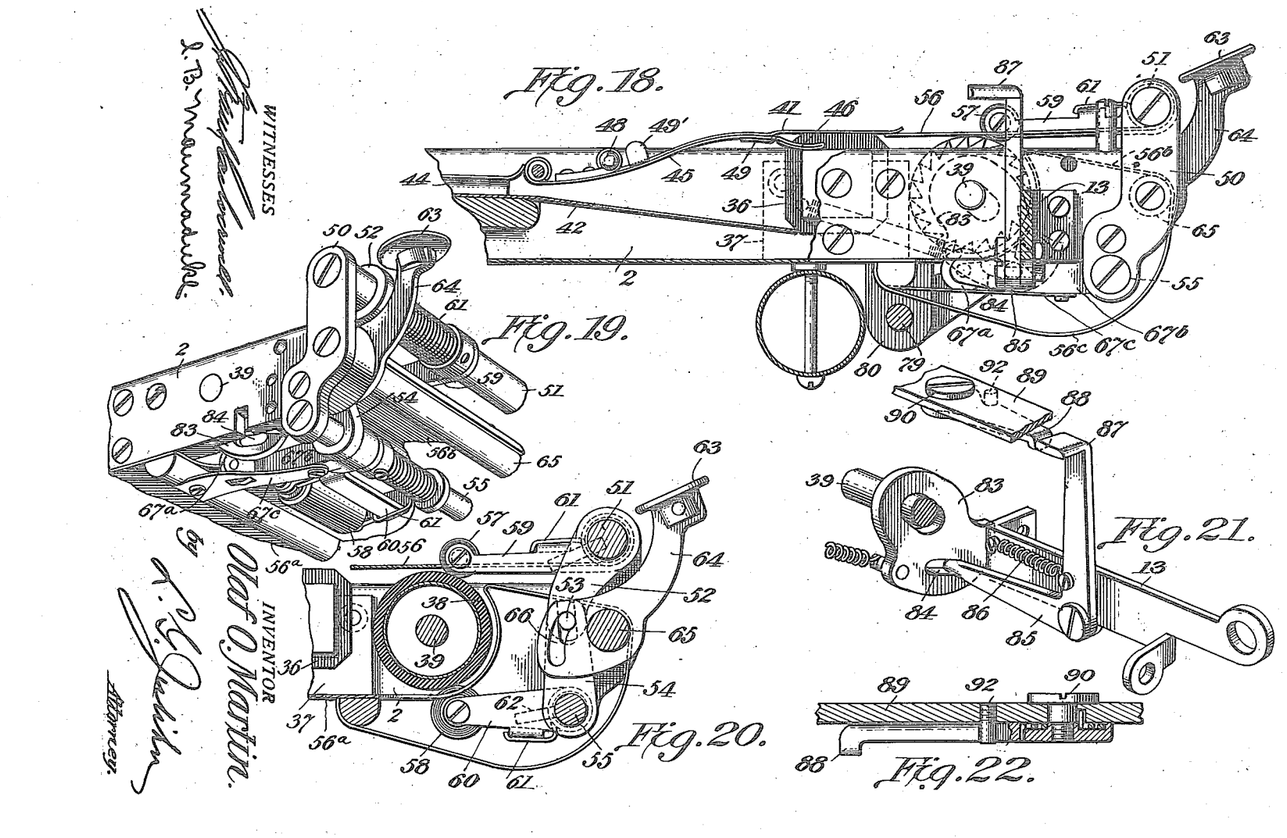
Fig. 18 is a side elevation of the front end of the platen frame, with certain of the parts broken away and others in section.
Fig. 19 is a perspective view of the left hand front corner of the platen frame and adjacent parts, more particularly the paper release lever.
Fig. 20 is a sectional view taken longitudinally at the front end of the platen and showing more particularly the paper release lever and associated parts.
Fig. 21 is a detail perspective view of the automatic line spacing lever, the actuator therefor movable with the carriage and the line space pawl carrier operated by the lever.
Fig. 22 is a sectional view showing the specific manner of mounting the actuator, shown in Fig. 21.

In the platen frame 2 is mounted a transversely disposed platen 36 having its opposite ends supported in platen sockets or rests 37 secured to the side bars of the frame 2. In advance of the platen is mounted a feed roller 38, carried by a spindle 39, at one end of which is a knurled wheel 40 to facilitate the manual manipulation of the feed roller 38. The paper sheet X is led from the paper roll 41, supported in suitable brackets at the rear end of the front side of 2, and is extended around the feed roller 38 and thence over the platen 36 to a paper table 42 at the rear end of which is a hinged paper roll guard 43 which guards the paper roll and guides the paper back over the roll, as shown in Fig. 10. Extending along the major portion of the paper table 42 are side guides 44 at the front end of which is hinged the rear edge of an apron 45, the front edge of which is supported just in rear of the upper side of the platen by fingers 46 which rest upon the square ends of the platen, as shown in Figs. 8 and 18. The paper passes down under this apron 45 and thence to the guides 44, adjustable margin guides 47 being extended from the apron 45 and resting upon the platen, as shown in Fig. 8. The margin guides 47 have their rear ends slidably connected to a guide rod 48 extending across the upper side of the apron, the front edge of which is slidably engaged by guide fingers 49 bent back from the margin guides. To facilitate the adjustment of the margin guides 47, the latter are provided with tabs 49' which may be readily grasped between the fingers of the operator.

At opposite sides of the front end of the platen frame 2 are secured two vertical bearing brackets 50 between the upper ends of which extend a transverse shaft 51 to which is fixed an arm 52 having a pin 53 engaging the forked upper end of a similar arm 54, extended from a shaft 55 similar to the shaft 51, but extended between the lower ends of the brackets 50. Supported at its rear edge from the shaft 51 and mounted to swing from said shaft, as an axis, is a scale bar 56 cut away at intervals, as shown in Fig. 8. In its passage from the paper roll 41 to the feed roller 38, the paper is supported by the bottom wall 56$^a$ of the platen frame. This wall is preferably formed of sheet metal which is bent up around the front side of the roller 38 to a point slightly below the upper side of the roller at which point it is bent forwardly to form a front paper table 56$^b$ and is thence bent back below the frame to form a guard 56$^c$. Coacting with the feed roller 38 are upper and lower pressure rolls 57 and 58 carried by the front ends of the arms 59 and 60, swung from the shafts 51 and 55 and urged toward the pressure roller by springs 61. Extended from the shafts 51 and 55 are releasing pins 62 which, when the shafts 51 and 55 are rotated by the operation of a release key 63, engage the arms 59 and 60 and urge said arms in opposite directions to release the pressure rolls 57 and 58 from the paper.

The release key is located at the left hand side of the front end of the platen frame and is mounted on a release lever 64, fulcrumed on a transverse frame bar 65 and provided with an eccentric slot 66 engaging the pin 53. Upon the depression of the release key 63 the lever 64 is swung to swing the arms 52 and 54 for the purpose of rocking the shafts 51 and 55 and thus effecting the withdrawal of the pressure rolls 57 and 58 from the pressure roll 38.

Figure 13:
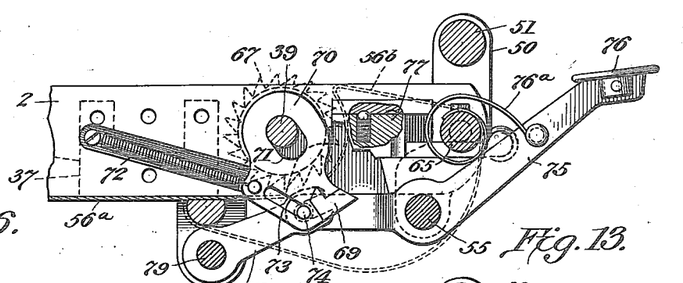
Figs. 13, 14 and 15 are longitudinal sectional views through the front end of the platen frame, showing the line spacing and motor controlling mechanism in progressive positions.
Figure 14:
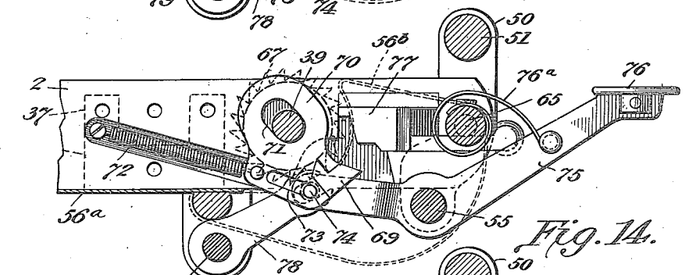
Figure 15:
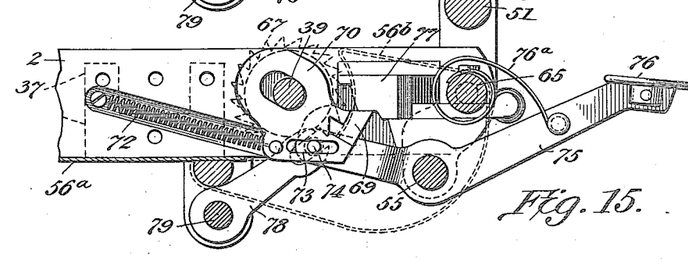
Figure 16:
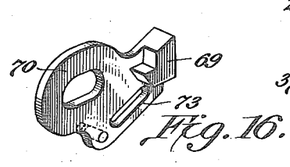
Fig. 16 is a detail view of the line space, pawl carrier and pawl.
Figure 17:
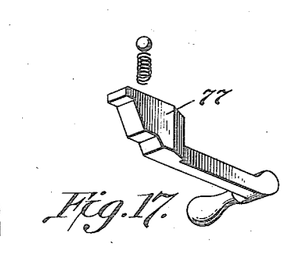
Fig. 17 is a similar view of the line space stop.

At opposite ends of the spindle 39 are secured line space ratchet wheels 67 and 68, the wheel 67, located at the right hand side of the platen frame, being disposed for engagement by line space pawl 69, carried by a pawl carrier 70 having an elongated slot 71 engaging the spindle 39. The pawl carrier 70 is normally retained in the position shown in Fig. 13 by a retracting spring 72 and is provided with a slot 73 engaged by a pin 74 projecting from the rear end of the line space lever 75, fulcrumed on the shaft 55 and provided with a line space key 76. The key 76 is normally retained in elevated position by a spring 76ª. Arranged to coact with the pawl carrier 70 is a graduated line space stop 77, adapted to be moved to different positions to provide a varying limit of movement for the pawl carrier 70 and thus secure a varying degree of rotation or line space feed of the feed roller 38. Coacting with the ratchet 68 is a check roller 67ª carried by an arm 67ᵇ, swung from the shaft 55, and urged toward the ratchet by a spring 67ᶜ.

It may be stated at this point that the combination, here shown, of a rotary line spacing element coacting with a line space lever and pawl, substantially in the manner here described, is disclosed in my co-pending application #545,608, wherein is also disclosed two sets of pressure rolls coacting with the rotary line spacing element and controlled by a release key, in a manner similar to the corresponding mechanism here described. The arrangement shown in the present application is specifically different from that shown in application #545,608, in that the supporting arms of the pressure rolls are so mounted as to leave a free and unobstructed passage through which loose leaves may be fed straight in front of the frame to the upper side of the rotary line spacing element. This arrangement is believed to be novel. It should also be stated that the idea of utilizing a platen, which is substantially square in cross section as well as the combination of the stationary platen with paper supporting and feeding mechanism, as here shown, is not original with me, but is the invention of George F. Watt.

It is desired to place the carriage retracting mechanism, as well as the line spacing mechanism, under the control of the key 76, so that when said key is operated to line space the work sheet, it will also cause the carriage retracting mechanism to be brought into action to retract the carriage, thus positioning both the work sheet and the carriage for the writing of a new line. To this end, the pin 74, carried by the rear end of the lever 75, is extended into engagement with the forked end of an arm 78, extended from the right hand end of a rock shaft 79, afforded bearings in the bracket 13 and in additional brackets 80, depending from the sides of the platen frame. At or adjacent to its left hand end, the shaft 79 is provided with an arm 81, adapted when swung back to engage a pin 82, projecting laterally from the sleeve 20. When the key 76 is depressed, it operates the line spacing mechanism to advance the work sheet and also swings the arm 78 to rock the shaft 79 and thus cause the arm 81, by engagement with the pin 82, to urge the sleeve 20 rearwardly. This movement of the sleeve, as we have already seen, causes the engagement of the motor clutch 19ª and 19ᵇ and closes the starting switch 28. In other words, the manipulation of the key 76 line spaces the work sheet and causes the motor 9 to be brought into action to retract the carriage 4.

It is desirable to also provide line spacing mechanism automatically operated by the carriage 4 upon its retraction and to arrange the same so that it can be rendered operative or inoperative at will. To attain this end, a pawl carrier 83, similar in all respects to the carrier 70, is associated with the line space ratchet 68 at the left hand side of the platen frame and into the slot 84 which corresponds to the slot 73 in the carrier 70, is extended the end of a bell crank lever 85. The lever 85 is fulcrumed on the bracket 13 and is retained in normal position by a spring 86. One of the arms of the lever 85 is disposed vertically and is provided with an angular extremity 87 disposed in the path of an arm 88, mounted at the under side of a plate 89, moving with the carriage 4. As the carriage reaches the limit of its retractile movement, the arm 88 engages the bell crank lever 87 and swings the latter against the resistance of the spring 86 to operate the pawl carrier 83 and thus effect a predetermined rotary movement of the line spacing roller 38. The carriage operated line spacing stop is intended to be used either independently of or in conjunction with the line spacing mechanism operated by the key 76. For instance, if the line spacing stop 77 is adjusted to give a maximum movement of the key operated line space mechanism, the maximum line spacing movement of the work sheet will result upon the depression of the key 76, and the carriage retracting motor will be started to retract the carriage and automatically effect an additional line spacing movement of the work sheet, by the operation of the automatic line spacing mechanism. If the maximum operation of the key operated mechanism effects a double line spacing movement of the work sheet and the carriage operated line spacing mechanism effects a single line space advance of the sheet, the described conjoint operation of these two mechanisms will give triple line spacing, consequent upon the depression of the key 76. As an example of the use of the carriage operated line spacing mechanism, independently of the key operated line spacing mechanism, it will be observed that if, with the carriage in the position shown in Fig. 1, the operator presses the motor key 25, the motor will be started and the carriage will be retracted without in any way affecting the line spacing mechanism operated by the key 76, since the pin 82 will merely move away from the arm 81, as shown in Fig. 2. When the carriage reaches the limit of its retractile movement, however, the carriage operated line spacing mechanism will effect a single line space advance of the work sheet. In addition to these two conditions of operation, comprehending the conjoint operation of the two line spacing mechanisms or the independent operation of the carriage operated mechanism, it is also desired to provide for the operation of the key operated line spacing mechanism independently of the carriage operated mechanism, and also for the motor retraction of the carriage without any line spacing operation whatever. These ends are attained by providing means whereby the carriage line spacing mechanism may be put out of action.

The arm 88 is carried by a headed screw 90 swiveled in the plate 89, and within a recess in said arm is coiled a spring 91 having its ends secured to the arm and plate respectively, and urging the arm against a pin 92 depending from the plate 89. If it is desired to place the carriage line spacing mechanism out of commission, it is simply necessary to swing the arm 88 out of interfering relation with the lever 85, where said arm may be held by tightening up the screw 90. With the arm 88 in its inoperative position, it will be seen that all line spacing movement of the roller 38 will be accomplished by the key operated line spacing mechanism, and if it is desired to effect the motor retraction of the carriage without any line spacing whatever, the motor may be brought into action by the direct operation of the motor clutch from the motor key 25.

It may be pointed out in conclusion that each of the two keys 25 and 76 control the operation of the motor; that the key 76 additionally serves as an actuating member for line spacing mechanism and indirectly causes the operation of a second line spacing mechanism, since it starts the motor to retract the carriage which in turn operates the second line spacing mechanism. Further the key 25 not only controls the operation of the motor, but also the operation of the line spacing mechanism operated from the motor by the retraction of the carriage and by reason of the arrangement for putting the carriage line spacing mechanism out of operation, the key 25 may be operated to cause the motor retraction of the carriage either with or without a consequent automatic operation of the line spacing mechanism.

It is thought that from the foregoing, the construction and operation of the illustrated embodiment of the invention will be fully comprehended, but I wish to be understood as reserving the right to effect such changes, modifications or variations of the illustrated structure as may come fairly within the scope of the protection prayed.

What I claim is:—

1. The combination with a stationary motor and a stationary support, of a typewriter including a machine frame movable in one direction on the support and a carriage movable on the frame in a direction at right angles to the movement of said frame, of carriage retracting connections between the carriage and motor, said connections being constructed and arranged to permit the movement of the machine frame relative to the motor.

2. The combination with a support and a machine frame movable thereon, of a carriage movable on the machine frame, a stationary motor, a shaft extended therefrom, and carriage retracting connections between the carriage and the shaft, certain elements of said connection being movable longitudinally of the shaft with the machine frame.

3. The combination with a support and a machine frame movable thereon, of a carriage movable on the frame, a stationary retracting motor, a motor shaft, and carriage retracting connections between the carriage and the motor shaft, said connections including a clutch associated with the motor shaft, one member of said clutch being movable longitudinally of the shaft with the machine frame.

4. The combination with the frame and carriage of a typewriter, of a spring drum, carriage retracting connections between the drum and carriage, a motor, and means for connecting the motor to the drum to retract the carriage.

5. The combination with the frame and carriage of a typewriting machine, of carriage propelling mechanism including a spring drum, a motor, and a variable connection between the motor and drum.

6. The combination with the frame and carriage of a typewriting machine, of carriage retracting mechanism including a motor, a motor shaft, a spring drum, a tape extending from the drum to the carriage, a clutch for connecting the drum to the motor shaft, and a key for operating the clutch.

7. The combination with the frame and carriage of a typewriter, of a carriage retracting motor, connections between the motor and carriage, said connections including a clutch, line spacing mechanism, a line spacing lever, and a connection between the line spacing lever and the clutch.

8. The combination with the frame and carriage of a typewriter, of a carriage retracting motor, a clutch in the line of connection between the motor and the carriage, a starting switch for the motor, line spacing mechanism, and a controlling key common to the line spacing mechanism, clutch and starting switch.

9. The combination with the frame and carriage of a typewriting machine, of a line spacing mechanism automatically operated upon the retraction of the carriage, of a carriage retracting motor, key operated line spacing mechanism, motor controlling means, and a connection between the motor controlling means and the key operated line spacing mechanism.

10. The combination with a support and a machine frame movable thereon, of a carriage movable on the machine frame, a stationary motor, and carriage retracting connections between the carriage and the motor, certain elements of said connection being movable with the machine frame.

11. The combination with a support and a machine frame movable thereon, of a carriage movable on the frame, a stationary retracting motor and carriage retracting connections between the carriage and the motor, said connections including a clutch, one member of which is movable with the machine frame.

12. The combination with the frame and carriage of a typewriter, of a motor and retractile connections between the carriage and motor, said connections including means whereby said connections will be accommodated in length to the relative positions of the carriage and motor.

13. The combination with the frame and carriage of a typewriter, of an electrical carriage-operating motor, line spacing mechanism for the typewriter, a starting switch for the motor and a controlling key common to the line spacing mechanism and starting switch.

14. The combination with the frame and carriage of a typewriter, of a carriage retracting motor, a starting switch for the motor, line spacing mechanism and a controlling key common to the line spacing mechanism and starting switch.

15. The combination with a stationary support, of a machine frame movable thereon, a carriage movable on the frame and carrying a printing mechanism, a motor mounted on the stationary support, retracting connections between the carriage and the motor, said connections including means accommodating the relative movement of the machine frame and motor, a platen coacting with the printing mechanism, line spacing mechanism, and a controlling connection between the line spacing mechanism and the carriage retractile motor.

16. The combination with a frame and carriage, of a motor, a motor shaft, a spring drum carried by said shaft but independently operative, a flexible member connecting the drum and carriage and held taut by the independent operation of the drum and means for connecting the drum to the shaft to turn therewith as a unit.

In testimony whereof I affix my signature in presence of two witnesses.

OLAF O. MARTIN.

Witnesses:
 KATE F. DARR,
 K. F. DOUGHTY.